United States Patent
Doniat et al.

[11] 3,887,400
[45] June 3, 1975

[54] METHOD AND APPARATUS FOR ELECTROCHEMICALLY PRODUCING AN ELECTRIC CURRENT

[75] Inventors: Denis Doniat, Moillesulaz/Ge.; Klaus Beccu, Troinex/Ge.; Augusto Porta, Geneva, all of Switzerland

[73] Assignee: Battelle Memorial Institute S.A. Automobiles Citroen

[22] Filed: May 14, 1973

[21] Appl. No.: 360,175

Related U.S. Application Data

[63] Continuation of Ser. No. 151,094, June 8, 1971, abandoned.

[30] Foreign Application Priority Data
June 9, 1970   Switzerland.................... 3619/70

[52] U.S. Cl............................................ 136/86 A
[51] Int. Cl. ..................................... H01m 29/04
[58] Field of Search................................ 136/86 A

[56] References Cited
UNITED STATES PATENTS
3,539,396   11/1970   Wagner........................ 136/86 A
3,592,698   7/1971   Hide Baba........................ 136/86 A

*Primary Examiner*—Allen B. Curtis

[57] ABSTRACT

Electric power is produced by electrochemical oxidation of zinc in suspension in an alkaline electrolyte. In order to prevent passivation of the zinc particles, the zinc-electrolyte suspension is continuously recycled during discharge so as to provide repeated passage of each zinc particle in an electric power producing manner past a negative current collector, with continual intermediate regeneration of each zinc particle by removal thereof from the collector between successive passages, for diffusion of the discharge by-products into the electrolyte before the particle is returned to the collector for the next passage and for renewed participation in said discharge.

7 Claims, 1 Drawing Figure

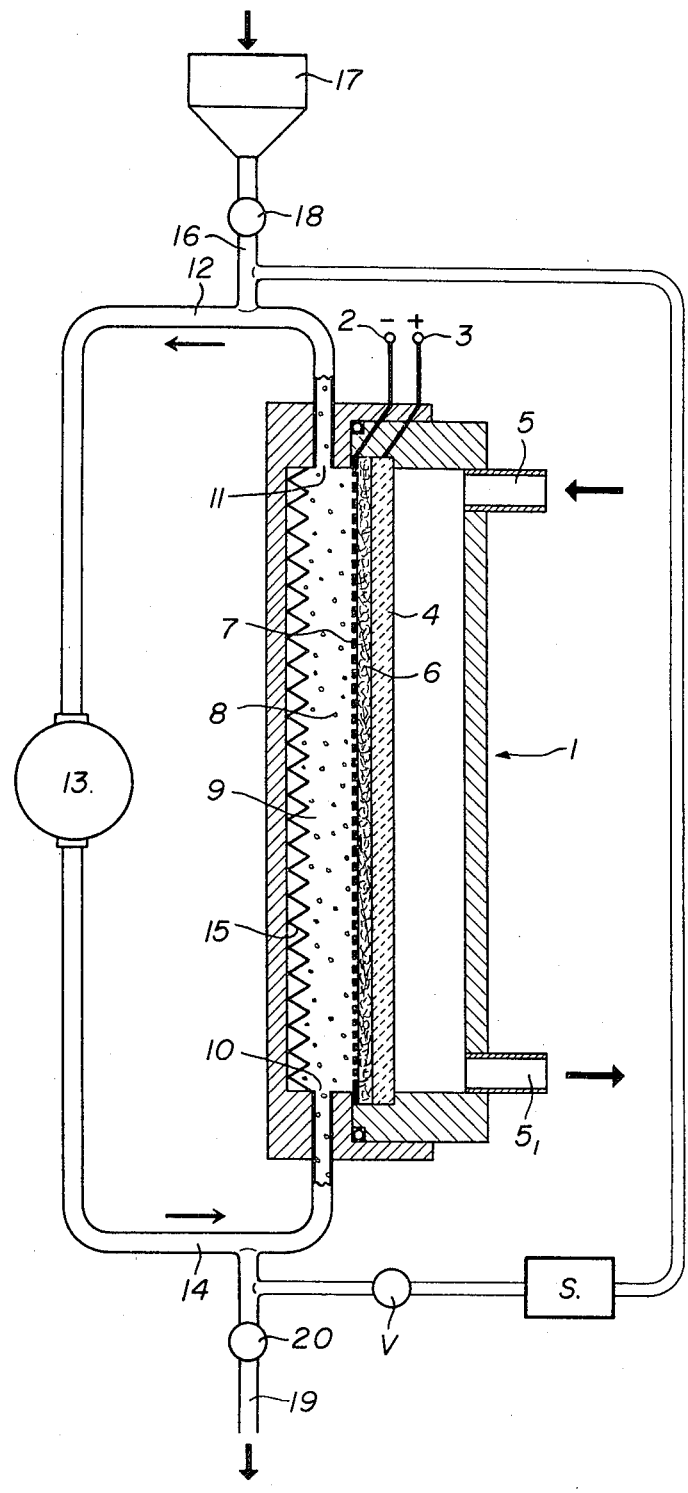

METHOD AND APPARATUS FOR ELECTROCHEMICALLY PRODUCING AN ELECTRIC CURRENT

This application is a continuation of application, Ser. No. 151,094, filed June 8, 1971, now abandoned.

The use of zinc as an active anodic material in electric cells has been known for many years. Thus, for example, a well-known cell element consists of a solid anode of zinc associated with a conventional air cathode and with an alkaline electrolyte. Besides the low cost of zinc, the latter is of great interest as an active anodic material because of the very large amount of electric energy it can give off when being electrochemically oxidized. However, in conventional cells having solid anodes of zinc, this advantage is only partly achieved because there is formed during discharge a layer of oxide at the surface of the anode. This leads to a more or less rapid passivation of the zinc and, consequently, to a very incomplete use of the latter for the generation of energy. It thus becomes essential for cell elements having a solid anode of zinc to operate with much reduced discharge currents since complete passivation is likely to occur very quickly with a high current discharge. But such limitation of the current does not however make it possible completely to avoid passivation of the zinc.

Passivation of the zinc in conventional cells thus constitutes a major obstacle which greatly limits their field of applications. This passivation also cancels out to a large extent the well-known advantages of zinc since it prevents the zinc in the anode from being completely consumed and hence notably reduces in practice the energy that can be electrochemically generated from the anode. Moreover, as a result of the above discharge current limitation, which is necessary in cell elements having a solid anode of zinc, the use of these cell elements is out of the question in a very large number of applications and is solely restricted to applications involving low current flow rates.

Several studies concerned with the anodic passivation of zinc have shown that the product resulting from the electrochemical oxidation of zinc in a liquid alkaline electrolyte is the soluble zincate ion, which, above a certain concentration in the electrolyte, causes zinc oxide to precipitate. Moreover, tests carried out in connection with these studies showed that if the electrolyte is agitated, the formation of an oxide film at the surface of a solid anode of zinc can to a certain extent be prevented.

Thus, it has been proposed to circulate the electrolyte in an accumulator having a solid anode of zinc, thereby to induce the oxidation products that form on the anode surface to precipitate in the electrolyte. This action is intended to increase the specific energy per unit mass of the accumulator through a reduction in the amount of electrolyte that is used in relation to that which would be necessary to dissolve fully the products of the zinc oxidation reaction. Now, the anode of this accumulator consists of a coating of zinc deposited on an inert support acting as a current collector and the circulation of the electrolyte is intended, basically, constantly to renew the surface of this coating by removing the zincate as it forms on this surface in the course of discharge. A very rapid discharge can nonetheless bring about the almost instantaneous formation of a layer of oxide over the entire surface of the zinc because the zincate in the electrolyte is removed only relatively slowly even when the electrolyte circulates very quickly.

In this known accumulator, the renewal of the zinc surface through circulation of the electrolyte essentially takes place in situ, i.e. in the same space as that in which occurs the oxidation reaction in the course of the discharge. It is therefore obvious that the consequence of the above-indicated notable difference between the speed with which the oxide forms in the course of discharge and the maximum possible speed at which it can be removed by circulating the electrolyte is that a rapid discharge will nonetheless always bring about passivation of the zinc.

Thus the desired object of preventing passivation of the anode by circulating the electrolyte could at best only be achieved with relatively low discharge currents in each element. The large discharge currents that are needed in many applications, e.g. for electrically driving urban vehicles, can therefore be obtained with accumulators of the kind having a solid anode of zinc and involving electrolyte circulation only if a more or less large number of elements is used for this purpose, each having a relatively low current. It is obvious however that an increase in the number of elements leads, inter alia, to a decrease of the specific capacity per unit mass and per unit volume.

Further, by using solid anodes, as described, only relatively small active surfaces can be obtained. Consequently, for a given discharge current, the current density per unit area of the active surface of the anode is relatively high, thereby increasing the risk of passivation.

It has also been proposed to use, for various purposes, electrodes in which the active material is dispersed thereby notably to increase the available active surface of the electrode. Thus, for instance, it has been proposed to use electrodes having an active mass in the form of a fluidized bed which is enclosed, together with a current collector, in a chamber through which a liquid electrolyte is made to circulate in an upward direction at a speed sufficient to fluidize the particles of the active mass.

However, to fluidize the particles of the active mass by means of the liquid electrolyte requires a relatively slow speed of circulation which must be adapted in a precise manner to the particles to be fluidized to prevent the latter from being carried up to the top of the bed by the electrolyte. Moreover, if the size of the particles is notably reduced, it becomes very difficult, or even impossible, to fluidize them satisfactorily. This explains why it has been proposed to use small inert pellets providing a support for a coating formed from the active material; this facilitates fluidization but obviously decreases to a notable extent the amount of active material able to take part in the desired electrochemical reaction and hence also decreases the specific capacity per unit mass and per unit volume of the electrode.

From the above, it is clear that the solutions proposed so far and mentioned hereinbefore hardly make it possible to avoid passivation of an active mass of zinc during a rapid discharge so that these solutions are at best applicable to zinc anode electrochemical generators having a relatively low current flow rate.

Furthermore, in situ recharging of zinc anode elements always gives rise to practical problems because of the difficulty of achieving a regular deposit during the electrodeposition of the zinc.

An object of the present invention is to produce electric power by electrochemical oxidation of zinc in a manner which will cancel the passivation of the zinc and hence lead to optimal use thereof and give rise to a relatively high current discharge intensity.

According to the invention, there is provided a method of producing an electric current by electrochemically oxidizing zinc forming the active mass of an anode and existing in the form or particles in suspension in a liquid alkaline electrolyte, by means of a solid, oxygen or metal oxide, cathode, which comprises circulating the anodic suspension through an anodic compartment containing a current collector, whereby the zinc particles impinge on the collector and undergo electrochemical oxidation upon coming into contact therewith, to produce a continuous discharge of current, and continuously recycling this suspension, during the discharge, along a path of travel such as to remove the suspension from the collector for a length of time sufficient to achieve dissolution and precipitation in the electrolyte of the products of said oxidation, thereby to remove said products from the surface of the zinc particles, and to return the suspension into contact with the collector for a fresh oxidizing action of the particles.

The invention further provides an electrochemical generator for producing an electric current, which comprises a galvanic cell having an anodic compartment containing a current collector and an active mass consisting of zinc particles in suspension in a liquid alkaline electrolyte and a solid, oxygen or metal oxide, cathode; and which further comprises a system for circulating this suspension, that includes said anodic compartment and a path of travel remote from the collector, having pumping means arranged continuously to recycle the suspension, successively through the compartment and along said path, whereby the zinc particles may successively and cyclically first be brought into contact with the anodic collector to produce a continuous discharge of current, by electrochemical oxidation of the zinc, and secondly be made to travel along said path whereby the oxidation products may dissolve and precipitate in the electrolyte; and input and discharge means for rapidly introducing the constituents of the anodic suspension in the circulation system and for removing the suspension from this system.

The forced recycling that is made to take place during discharge ensures that the zinc particles are brought into rapidly repeated contact with the collector and consequently enables a rapid discharge to be effected by oxidation of the zinc at their surface. Further, the removal of the particles in suspension, during this recycling action, for a length of time sufficient to enable the dissolution and the precipitation of the oxide in the electrolyte, at the same time ensures rapid and complete depassivation of the zinc before the particles are returned to the collector to take part again in the discharge reaction. By virtue of this recycling action during discharge there is achieved a separation, in space, between the zone where the electrochemical oxidation occurs by contact of the zinc particles with the anodic collector and the zone where the products resulting from the oxidation are separated from the zinc particles. As a result of this recycling action and of this simple separation into oxidation product formation and removal zones, it becomes possible to achieve optimal conditions, firstly, for the rapid discharge and, secondly, for the removal of the oxidation products as soon as they come to be formed. The generator can thus supply, either intermittently or continuously, very large currents, right up to the time the zinc has become more or less fully consumed, by virtue of this complete and continuous depassivation of the zinc particles that come into contact with the collector in the course of the discharge.

It will readily be seen that the same result cannot be achieved with known current generators in which the active mass of zinc never moves away, during discharge, from the actual location where the electrochemical oxidation of the zinc occurs, for circulation of the electrolyte at that location, even it were rapid, would not provide the conditions and time needed for the rapid removal, in situ, of the oxidation products as they form in the course of a prolonged discharge with a high current flow rate. In these known generators, it is therefore necessary greatly to limit the discharge current and possibly the duration of each discharge phase so as to avoid electrochemical passivation of the anode. It is obviously highly undesirable to replace the active mass of zinc, as a result of its passivation, well before it is fully consumed for not only is this costly but this also involves more or less frequent interruptions in the operation of the generator.

The single FIGURE of the accompanying drawing diagrammatically shows by way of example a vertical section through one form of embodiment of the generator according to the invention.

The illustrated generator is made up of a single primary-cell comprising a container 1 fitted with a negative terminal 2 and a positive terminal 3. An air cathode 4, connected to the terminal 3, is vertically disposed in the container 1 and is supplied with air via an inlet pipe 5 from a source of air (not shown) such as a small fan, the nitrogen and the excess of air issuing through an outlet pipe $5_1$. A porous separator 6 is placed between the cathode 4 and a current collector 7, connected to the negative terminal 2. In addition to the collector 7, the anode comprises an active mass made up of zinc particles 8 in suspension in an aqueous alkaline electrolyte, these particles being diagrammatically shown on a much enlarged scale. The anodic collector 7 thus defines one side of an anodic compartment 9 for the circulation of the anodic suspension between a lower inlet 10 and an upper outlet 11 in this compartment.

The anodic compartment 9 forms part of a closed circuit for the circulation of the anodic suspension during discharge, this circuit further comprising an upper, discharge, conduit 12 connected to the outlet 11 and leading to the inlet of a circulating pump 13, and a lower, feed, conduit 14 connected to the outlet of this pump and opening in the compartment 9, at the inlet 10 therof. Moreover, a strip 15, folded in a zig-zag manner, is disposed in the anodic compartment 9, opposite the anodic collector 7, in order greatly to increase agitation in the anodic suspension as it passes from the inlet 10 to the outlet 11. This great agitation enables the zinc particles circulating in suspension through the anodic compartment 9 to come into better contact with the collector 7.

The zinc particles may in the present instance have a mean size of 20 to 30$\mu$ but it should be noted that this size is in no way critical per se and can easily vary to a very large extent ranging from 5 to 200μ, or even beyond. The anodic current collector 7 here consists of nickel gauze having small meshes of for example 0.5 mm, but any other open-work collector can be used, such as perforated foil, made for instance of nickel or any other material which is a good electrical conductor and which is chemically inert in relation to the electrolyte. Use could also be made of a collector which does not have an open-work structure; in this case, the anodic suspension would circulate between this collector and the separator.

For the electrolyte, use is made in this instance of a 30 percent by weight aqueous solution of potassium hydroxide, but any other liquid alkaline electrolyte could in principle be used, e.g. a NaOH solution, and its concentration can be adapted from case to case to suit the requirements of the use to which the generator is to be put.

The cathode 4 illustrated in the FIGURE can be any suitable, plane, air cathode of conventional type consisting for example of a sintered porous nickel body covered with a layer of catalytic material prepared from active carbon and silver. The rear surface of this cathode, which is supplied with air, is provided with a porous hydrophobic layer, e.g. of polytetrafluoroethylene, through which the air can pass, whereas its front surface is here in contact with the porous separator 6. The latter may be of any conventional type, such as a sheet of felt made from synthetic fibres, e.g. nylon, which will enable the electrolyte to pass therethrough but stop the passage of the zinc particles.

The generator comprises moreover an input pipe 16 connected to the upper conduit 12 and fitted with a hopper 17 and with a cock 18. The cock 18 is opened to enable simultaneous or separate introduction of the anodic suspension constituents into the generator. The latter also comprises a discharge pipe 19 connected to the lower conduit 14 and fitted with a cock 20, which cock is opened to enable the anodic suspension to be discharged when it needs to be replaced.

To operate the above-described generator, once the anodic suspension has been introduced and the terminals 2 and 3 have been connected to an outside user circuit, it suffices to feed air to the cathode 4 via the pipe 5, on the one hand, and to start up the pump 13, on the other hand, thereby to place the zinc particles in suspension and to bring about rapid circulation of the anodic suspension thus formed. There is thus set up an agitated flow by virtue firstly of the circulation and secondly of the effect of the strip 15; as a result, the zinc particles in the suspension circulating through the anodic compartment 9 come to impinge repeatedly on the collector 7, thus causing, while in contact, an electrochemical oxidation at their surface and at the same time a charge transfer each time a particle comes into contact with the collector. The products resulting from the electrochemical reaction and which form on the surface of the zinc particles, as the suspension passes through the compartment 9, are, as already mentioned, liable to dissolve and to precipitate in the alkaline solution. These two phenomena are obviously highly desirable since they enable the particles to be rid of the electrochemical reaction products that have formed on their surface during the discharge. However, the time that is needed to dissolve and to precipitate the products derived from the electrochemical reaction is much longer than the time taken for these products to form during the electrochemical oxidation reaction that occurs as each zinc particle comes into contact with the anodic collector. With the above described generator this can be taken into account very simply, for it continuously removes the suspension containing the zinc particles that have been subjected to electrochemical oxidation at their surface during discharge in the compartment 9, and then rapidly circulates this suspension through the discharge conduit 12, the pump 13 and the supply conduit 14. The zinc particles that are recycled in suspension between the outlet 11 and the inlet 10 are thus brought into prolonged intimate contact with the electrolyte during this circulation. By appropriately choosing the conduits 12 and 14 this circulation can in all cases be made long enough for the electrochemical reaction products formed in the anodic compartment 9 to dissolve and precipitate. It thus becomes possible continuously to draw from the generator very large currents for very long periods of time, without any danger of passivation of the zinc. The continuous regeneration of the surface of the particles also enables the zinc forming the anodic active mass to be practically fully consumed, hence achieving optimal utilization of the zinc.

Because of the continuous forced circulation of the suspension of zinc particles in a liquid alkaline electrolyte along a set circuit, as described, a maximum quantity of electrical energy can be produced by the generator per kilogram of zinc used.

In order to increase the operational autonomy of the described generator, the latter could, if need be be, supplied with zinc particles through the hopper 17 to replace the zinc that has been used up. Further, a suitable separator S, whether static or cynamic and which is connected firstly to the conduit 19 via a cock V and secondly to the conduit 16, serves to withdraw part of the suspension having been recycled in the course of discharge, to separate from the withdrawn part the electrolyte it contains and to return this electrolyte back into circulation in the generator.

The described form of embodiment has been given by way of example only and various modifications can be made to suit specific applications. For instance, instead of having a single cell or element as described, the generator may comprise a plurality of such elements, whether connected in series or in parallel, depending on the current and the voltage that is needed. In such a event, some parts of the generator, e.g. the circulation pump or the air source, can be associated with several elements at the same time, so as to reduce the cost, the weight and the bulk of the generator. Also, the elements could be connected to common collector conduits for the air and possibly for the anodic suspension in various ways.

Furthermore, if the generator is required to have a large operational autonomy, it can be provided with an auxiliary tank containing a mixture of zinc particles and of electrolyte, the solid phase concentration of this mixture (particles) being very much greater than that of the suspension circulating in the generator, and with injection means for feeding such concentrated suspension to the generator from the tank. Suitable separating means, such as those mentioned earlier, could than be provided to withdraw from the generator part of the anodic suspension and to separate therefrom a major part of the electrolyte which part would then be put back into circulation in the generator. The tank could then also be used to receive the particles that have been separated out. The concentration of the solid phase in suspension can thus be kept constant in the anodic compartment. It thus becomes possible to increase the proportion of zinc that can be consumed in the generator and consequently to obtain a larger capacity with a relatively small amount of electrolyte, so that the overall weight of the generator, including the above mentioned auxiliary means, can be reduced in relation to a generator of equal capacity which is not provided with such means. This can be explained by the fact that, for practical reasons, the quantity of particles that can be placed in suspension in a given volume of electrolyte cannot be increased at will. By replacing the consumed zinc particles, from the auxiliary tank, the generator can be operated for very much longer periods of time with a suspension containing an optimal charge of zinc particles, whilst ensuring recycling of the suspension, as provided by the present invention to obviate the passivation of the zinc.

Moreover, an auxiliary tank containing a reserve of zinc powder and having injection means can be arranged in such manner as to enable the addition of zinc.

The pump used in the described form of embodiment for circulating the anodic suspension can be driven by any conventional mechanical or electrical means. The pumping energy needed for the circulation amounts in fact to a very small proportion of the electrical energy that the generator is capable of supplying and becomes virtually negligible with high power generators. The pump can therefore readily be driven by an electric motor which is supplied either by an external source such as a small auxiliary accumulator or by the generator per se, and without decreasing in so doing its capacity to any notable extent. However, when the generator is meant to operate with more or less long interruptions, it would be of advantage to provide control means for stopping the pump thereby to avoid any useless loss of energy. Experience has shown that self starting of the generator is in fact possible, even when it serves directly to supply the motor driving the pump, since there always remains a sufficient number of zinc particles in the anodic compartment, in contact with the anodic collector, to provide the small amount of power needed to set in motion the pump which in turn rapidly sets up the circulation that ensures proper operation of the generator. However, any other pumping means can be used instead of a mechanical pump. For example, the suspension could be made to circulate by bubbling therethrough a gas under pressure in the desired direction of circulation. This bubbling preferably takes place through the anodic compartment so as to produce a very strong agitation which will bring the zinc particles into better contact with the collector. A satisfa tory contact between the particles and the collector can however be established without resorting to agitating means such as described (the zig-zag folded strip 15): By suitably selecting the shape and size of the anodic compartment, as also the speed of flow, having regard to the viscosity of the suspension, flow conditions can be established that will, in most cases, bring about effective contact between the zinc particles and the collector.

As for the cathode, clearly the generator can comprise any air or oxygen diffusion cathode or a metal oxide cathode. A pumping system comprising at least one mobile membrane could moreover be used to set in motion the anodic suspenion, either by passing the latter through the current collector in a to and fro motion or continuously along the latter, as described earlier.

Once the zinc particles of the anodic suspension have more or less completely been consumed, the discharge of the suspension and its replacement with fresh suspension can be done very quickly. In this connection, the described input and discharge means enalbe the anodic suspension to be discharged and rapidly replaced with fresh suspension. Clearly, however, use could also be made, for this purpose, of means other than those described. For example, the discharge and filling could be done very quickly with the aid of auxiliary pumping means.

In all cases, the described generator can be operated to supply current without any major interruption and this is of cource of great practical advantage for many applications, in particular for electric driving power.

The spent anodic suspension that is collected at each discharge of the generator can be regenerated without difficulty in an electrolyte tank so arranged that the zinc can be electrodeposited on a negative electrode, for example of nickel. Use would be made in this case of scraping or vibrating means associated with this electrode and adapted to remove zinc particles from the electrode as they are electrodeposited and to put them in suspension in the electrolyte. the latter would then again contain zinc particles to form an anodic suspension once more ready for use as the active mass for the generator.

The operations involved in discharging and replacing the anodic suspension, and in regenerating the latter, could be performed at specialized servicing stations.

The oxygen that is given off at the positive electrode of the electrolysis tank used for regeneration purposes could be stored for subsequent use, e.g. for supplying an oxygen diffusion electrode forming the cathode of the generator.

For instance in the case of a generator intended for electric driving power purposes, the user can, if desired, avail himself of an electrolysis tank as mentioned earlier in order that be may himself perform the discharge and regeneration of the anodic suspension, by connecting this tank to a suitable external source of current, when the generator is inoperative. It would also be possible to fit an electric vehicle, powered by this generator, with such an electrolysis tank so that, after a discharge operation, at least a partial regeneration operation can be performed on the vehicle with the aid of an external source of current.

We claim:

1. A method of producing electric power by electrochemical oxidation of zinc powder in an alkaline galvanic cell having a solid positive electrode in the form of an oxygen or metal oxide electrode operatively associated with a negative current collector for contact with the zinc powder undergoing oxidation during discharge, said method comprising the steps of:

producing electric current by effecting circulation of a suspension, formed of zinc powder in an alkaline electrolyte, along a closed-loop path which is composed, on the one hand, of a first part wherein are effected the steps of providing flow of the entire suspension under agitated flow conditions along the surface of the negative current collector and of causing repeated impingement of the suspended zinc particles on said surface to thereby undergo repeated momentary oxidations and, on the other hand, of a second part wherein the suspension containing the said zinc particles carrying thereon the products of said momentary oxidations is removed from the collector and made to circulate without contacting the said collector so as to continually provide transfer of said products of said momentary oxidations from the suspended zinc particles to the bulk of the electrolyte of the suspension circulating along said second part before renewed flow thereof along the said collector, whereby said circulation along the closed-loop path provides continuous discharge, by a rapid succession of said momentary oxidations, with continual recycling of said suspension to said collector from said second part, said suspension which is being recycled to said collector containing said zinc particles from which said oxidation products have been removed and which are composed of zinc in a sufficient amount to insure substantially constant current delivery by the cell, whereby said zinc particles are gradually consumed in a succession of rapid passages thereof through the cell during discharge.

2. A high energy density generator for producing electric power by electro-chemcial oxidation of zinc powder, said generator comprising at least one alkaline galvanic cell including a solid positive electrode in the form of an oxygen or metal oxide electrode operatively associated with a negative current collector for contact with the zinc powder undergoing oxidation during discharge, a channel arranged in the form of a closed-loop path filled with a suspension of zinc powder in an alkaline electrolyte, pumping means in said channel for circulating said suspension along said closed-loop path during discharge; said negative collector being arranged in a first part of said channel, opposite said positive electrode, a porous separator permeable to the said electrolyte and impermeable to the particles of the powder in suspension separating said negative collector from said positive electrode, said suspension flowing along the surface of said negative collector for impingement of said particles thereon whereby to undergo momentary oxidations, a second part of said channel being arranged to form the remaining part of said closed-loop path and to provide circulation of the suspension without contacting said collector to allow transfer of the products of said momentary oxidations from the surface of the particles to the bulk of the electrolyte of said suspension before renewed flow of said zinc particles along said collector, and means in said closed path for causing said particles to repeatedly impinge against said negative collector, the entire arrangement being such as to produce electric power by circulation of said suspension along said channel whereby to provide continuous discharge by a rapid succession of said momentary oxidations.

3. A generator as claimed in claim 2, wherein said means for repeated impingement of said particles from said negative collector comprises baffle means in said first part of the channel facing said separator.

4. A method of producing electric power by electrochemcial oxidation of zinc powder in an alkaline galvanic cell having a solid positive electrode in the form of an oxygen or metal oxide electrode operatively associated with a negative current collector electrode for contact with the zinc powder during discharge, said method comprising the steps of:

a. providing said cell with a free internal passage extending from a cell inlet to a cell outlet respectively arranged at opposite ends of said negative collector electrode, in such a manner that said passage allows rapid, substantially unobstructed circulation of a liquid alkaline electrolyte, together with the zinc powder, from said inlet, along said negative collector electrode to said outlet;

b. forming a closed-loop circulating channel including said internal passage by arranging pumping means in an external recirculating channel directly connecting said cell outlet to said cell inlet;

c. filling said closed-loop channel with a suspension of a mass of zinc powder dispersed in the electrolyte and adapted to produce electric power by undergoing oxidation during discharge; and d. effecting discharge to produce electric power by circulating said suspension along said closed-loop channel in such a manner as to ensure circulation of the suspension through said internal passage under agitated flow conditions providing repeated impingement of the suspended zinc powder particles of said mass on said negative collector electrode, so that the said zinc particles are caused to undergo intermittent oxidation by repeated but only momentary oxidations during successive passages thereof through said cell, said suspension being continually recirculated along said external channel to provide intimate contact of said particles with the electrolyte so as to thereby allow continual transfer of the products of said oxidations from the surface of each said zinc particle to the bulk of the electrolyte and to thereby prevent accumulation of oxidation products on said surface during discharge, said suspension which is being recycled along said external channel to the cell containing said zinc particles from which said oxidation products have been removed and which are composed of zinc in a sufficient amount to insure substantially constant current delivery by the cell, whereby said zinc particles are gradually consumed in a succession of rapid passages thereof through the cell during discharge.

5. A high power density electrochemcial generator for producing electric power comprising:

at least one galvanic cell having outer wall portions, and including inlet and outlet means, a negative current collector electrode extending between said inlet and outlet means, partition means permeable only to the electrolyte, a positive electrode in the form of an oxygen or metal oxide electrode, and pumping means for circulating a liquid alkaline electrolyte;

a. said cell comprising a fixed porous partition arranged to form a free internal passage to allow rapid circulation, under agitated flow conditions, of a suspension of zinc powder in the electrolyte from the inlet means, along said negative collector electrode to said outlet means;

b. an external recirculating channel associated with said pumping means and directly connecting said outlet means to said inlet means to form a closed-loop circulating channel composed only of said internal cell passage together with said external channel;

c. said external channel including admission means for filling said closed-loop channel with a suspension of zinc powder in said electrolyte and with discharge means for removal of spent electrolyte containing the products of oxidation after the zinc powder has been substantially consumed during discharge to produce electric power; and d. means for causing said particles to repeatedly impinge against said negative current collector;

said pumping means providing continuous discharge by effecting circulation of said zinc-electrolyte suspension under agitated flow conditions along said internal passage, with continual intermediate recirculation of said suspension along said external channel.

6. A generator according to claim 5, wherein said internal passage comprises baffle means arranged adjacent said cell wall portion and facing said negative collector electrode to cause the zinc powder particles to repeatedly rebound against said negative collector electrode during circulation of said suspension along said internal passage.

7. A generator as claimed in claim 5 wherein said pumping means and said means which causes repeated impingement of said particles against said negative current collector comprises a pump disposed in said external channel.

* * * * *

UNITED STATES PATENT AND TRADEMARK OFFICE
CERTIFICATE OF CORRECTION

PATENT NO. : 3,887,400
DATED : June 3, 1975
INVENTOR(S) : DONIAT ET AL

It is certified that error appears in the above-identified patent and that said Letters Patent are hereby corrected as shown below:

Change number of Swiss Priority Application from "3619/70" to --8619/70--

Signed and Sealed this

Third Day of October 1978

[SEAL]

Attest:

RUTH C. MASON
Attesting Officer

DONALD W. BANNER
Commissioner of Patents and Trademarks